(12) United States Patent
Nakajima

(10) Patent No.: US 9,350,118 B2
(45) Date of Patent: May 24, 2016

(54) CHARGING PORT LOCKING DEVICE

(71) Applicant: NISSAN MOTOR CO., LTD., Kanagawa (JP)

(72) Inventor: Tsuyoshi Nakajima, Sagamihara (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/347,150

(22) PCT Filed: Sep. 20, 2012

(86) PCT No.: PCT/JP2012/074066
§ 371 (c)(1),
(2) Date: Mar. 25, 2014

(87) PCT Pub. No.: WO2013/047322
PCT Pub. Date: Apr. 4, 2013

(65) Prior Publication Data
US 2014/0235087 A1 Aug. 21, 2014

(30) Foreign Application Priority Data

Sep. 27, 2011 (JP) ................... 2011-211504

(51) Int. Cl.
*H01R 13/62* (2006.01)
*H01R 13/639* (2006.01)
*B60L 11/18* (2006.01)
(Continued)

(52) U.S. Cl.
CPC .......... *H01R 13/639* (2013.01); *B60L 11/1818* (2013.01); *B60L 11/1825* (2013.01); *B60L 11/1877* (2013.01); *B60L 2270/32* (2013.01); *B60L 2270/34* (2013.01); *H01M 2220/20* (2013.01); *H01R 13/6275* (2013.01); *H01R 13/6397* (2013.01); *H02J 7/0042* (2013.01); *Y02T 10/7005* (2013.01); *Y02T 10/705* (2013.01); *Y02T 10/7072* (2013.01); *Y02T 90/121* (2013.01); *Y02T 90/128* (2013.01); *Y02T 90/14* (2013.01)

(58) Field of Classification Search
CPC ...................... H01R 13/6397; H01R 13/62933
USPC .......................................... 439/304, 310, 133
See application file for complete search history.

(56) References Cited

U.S. PATENT DOCUMENTS 5,906,500 A * 5/1999 Kakuta et al. ................. 439/310
6,123,569 A 9/2000 Fukushima et al.
(Continued)

FOREIGN PATENT DOCUMENTS

JP H09-161884 A 6/1997
JP 2011-165558 A 8/2011
(Continued)

*Primary Examiner* — Hae Moon Hyeon
(74) *Attorney, Agent, or Firm* — Young Basile Hanlon & MacFarlane P.C.

(57) ABSTRACT

A charging port locking device is provided with an engagement member provided in a charging connector, for regulating the removal of the charging connector by engagement with an engagement part provided in a charging port, a restriction member provided in a vehicle, for restricting the disengagement of the engagement member, and a lock actuator for driving the restriction member. By virtue of the charging port locking device, the unintentional disconnection of the charging connector from the charging port can be avoided during charging in a state in which the charging port and the charging connector are connected.

4 Claims, 12 Drawing Sheets

(51) Int. Cl.
*H01R 13/627* (2006.01)
*H02J 7/00* (2006.01)

(56) References Cited

U.S. PATENT DOCUMENTS

| | | | | |
|---|---|---|---|---|
| 6,203,355 | B1 * | 3/2001 | Neblett et al. | 439/372 |
| 8,075,329 | B1 * | 12/2011 | Janarthanam et al. | 439/304 |
| 8,376,768 | B2 * | 2/2013 | Kurumizawa et al. | 439/304 |
| 8,517,755 | B2 * | 8/2013 | Hirashita | 439/304 |
| 8,523,589 | B2 * | 9/2013 | Kurumizawa et al. | 439/304 |
| 8,602,804 | B2 * | 12/2013 | Kurumizawa et al. | 439/304 |
| 8,753,136 | B2 * | 6/2014 | Hirashita et al. | 439/304 |
| 8,944,477 | B2 * | 2/2015 | Proefke et al. | 292/144 |
| 2011/0201223 | A1 | 8/2011 | Kurumizawa et al. | |
| 2011/0300728 | A1 * | 12/2011 | Katagiri et al. | 439/147 |
| 2012/0133326 | A1 * | 5/2012 | Ichikawa | B60L 11/14 320/109 |
| 2012/0238122 | A1 * | 9/2012 | Hirashita et al. | 439/304 |
| 2014/0235086 | A1 * | 8/2014 | Nakajima | 439/347 |
| 2014/0235087 | A1 * | 8/2014 | Nakajima | 439/347 |
| 2014/0235089 | A1 * | 8/2014 | Nakajima | 439/350 |
| 2014/0300319 | A1 * | 10/2014 | Nakajima | 320/109 |
| 2014/0300320 | A1 * | 10/2014 | Nakajima | 320/109 |
| 2015/0035478 | A1 * | 2/2015 | Uchiyama et al. | 320/107 |
| 2015/0037994 | A1 * | 2/2015 | Nakajima | 439/304 |

FOREIGN PATENT DOCUMENTS

| | | |
|---|---|---|
| WO | 2010137144 A1 | 12/2010 |
| WO | 2011000776 A1 | 1/2011 |

* cited by examiner

CHARGING PORT LOCKING DEVICE

CROSS REFERENCE TO RELATED APPLICATION

The present application claims priority to Japanese Patent Application No. 2011-211504, filed Sep. 27, 2011, incorporated herein in its entirety.

TECHNICAL FIELD

The present invention relates to a charge port lock device that locks a charge connector for supplying charging power from outside to a battery installed on a vehicle to a charge port that is provided on the vehicle and to which the charge connector is connectable.

BACKGROUND

Japanese Unexamined Patent Publication No. H9-161884 discloses a prior-art charge port lock device. The charge port lock device includes a charge connector for connecting a charge port of an electric vehicle to a charging station, and a battery of the electric vehicle is charged by the connection of the charge port and the charge connector.

SUMMARY

It takes a relatively long time to charge a relatively large capacity battery installed on a vehicle such as an electric vehicle by using a charging station. If a charging port and the charging station are erroneously disconnected from each other during this time, charging may fail. In such a case, the charging has not been completed when a driver returned to the charging station at an estimated time of charging completion.

An object of the present invention is to provide a charge port lock device that can avoid an unintended disconnection of a charge connector from a charge port during charging in a connected state of the charge connector with the charge port.

An aspect of the present invention provides a charge port lock device comprising: a charge port that is provided on the vehicle and to which a charge connector for supplying charging power to a battery installed on a vehicle is connectable; an engagement member (engagement means) that is provided on the charge connector, and that restricts, while the charge connector is connected to the charge port, disconnection of the charge connector from the charge port by being engaged with an engagement portion provided on the charge port and allows the disconnection of the charge connector from the charge port by being disengaged with the engagement portion by a release operation; a restriction member (restriction means) that is provided on the vehicle, and that can switch the engagement member between a restricted state to restrict disengagement from the engagement portion and an unrestricted state not to restrict disengagement from the engagement portion; and a lock actuator that drives the restriction member between a lock position for putting the restriction member in the restricted state and an unlock position for putting the restriction member in the unrestricted state.

BRIEF DESCRIPTION OF DRAWINGS

The description herein makes reference to the accompanying drawings wherein like reference numerals refer to like parts throughout the several views.

DESCRIPTION OF EMBODIMENTS

First Embodiment

Figure 1:
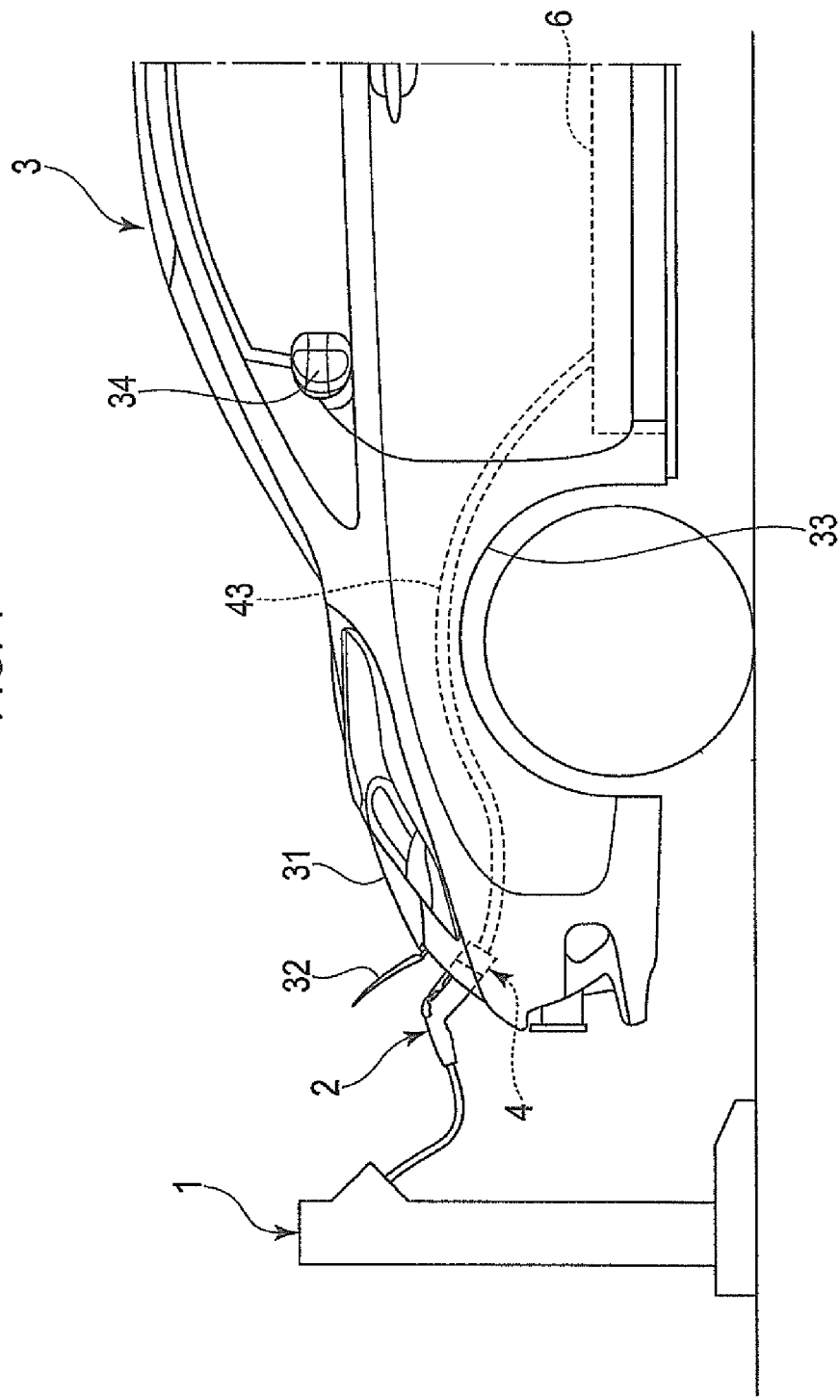
FIG. 1 is a side view of a front section of a vehicle provided with a charge port lock device according to a first embodiment (during charging).

As shown in FIG. 1, a charge port 4 is provided at a front of a front hood 31 of a vehicle 3. The charge port 4 is electrically connected, by a cable 43, with an in-vehicle battery 6 mounted on a floor of the vehicle 3. The charge port 4 is disposed, lower than a side mirror 34, at an almost equivalent height to an upper edge of a wheel arch 33. The charge port 4 is closed by a lid 32 while charging is not done. A charging station 1 as a charging infrastructure is provided with a charge connector 2 for supplying electric power. When charging is done, the lid 32 is opened and then the charge connector 2 is connected to the charge port 4.

Note that the vehicle 3 in the present embodiment includes a quick charge port to be connected to a quick charger, and a normal charge port to be connected to a domestic power supply. It takes a relatively short time for charging by a connection to the quick charge port and thereby the vehicle 3 is not left for a long time, so that a connection to the normal charge port will be explained as an example in the present embodiment hereinafter. Note that, as a matter of course, it is possible to provide the port lock device for the quick charge port.

Figure 2A:
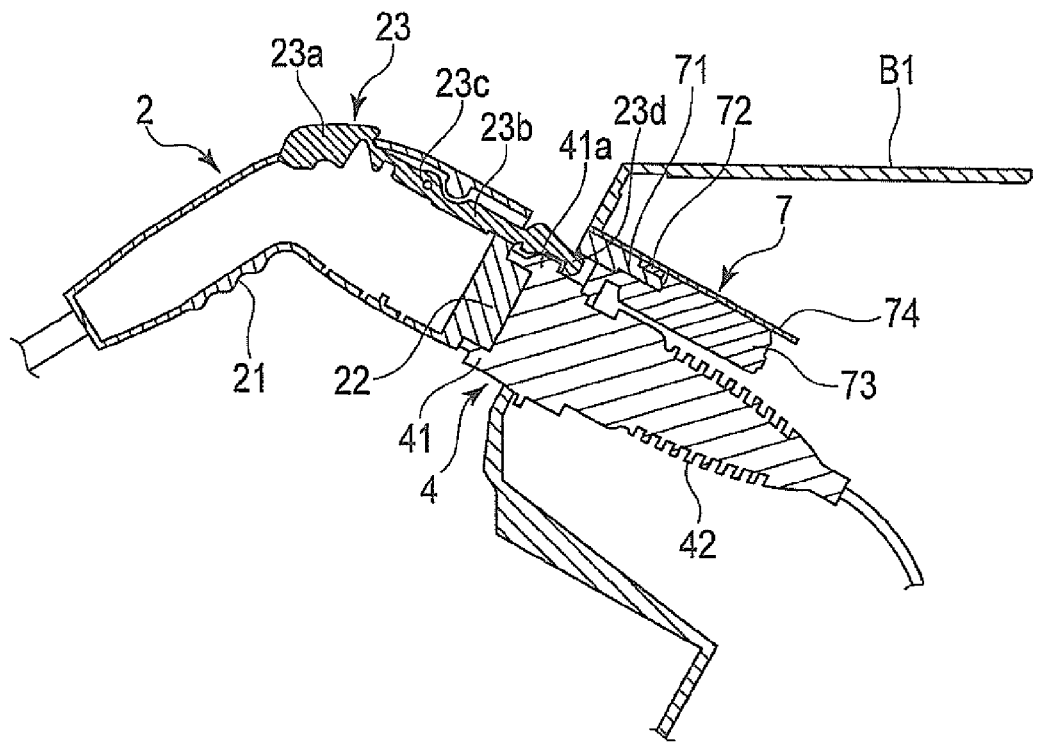
FIG. 2A is a schematically cross-sectional view showing a connected state of a charge connector and a charge port in the charge port lock device.
Figure 2B:
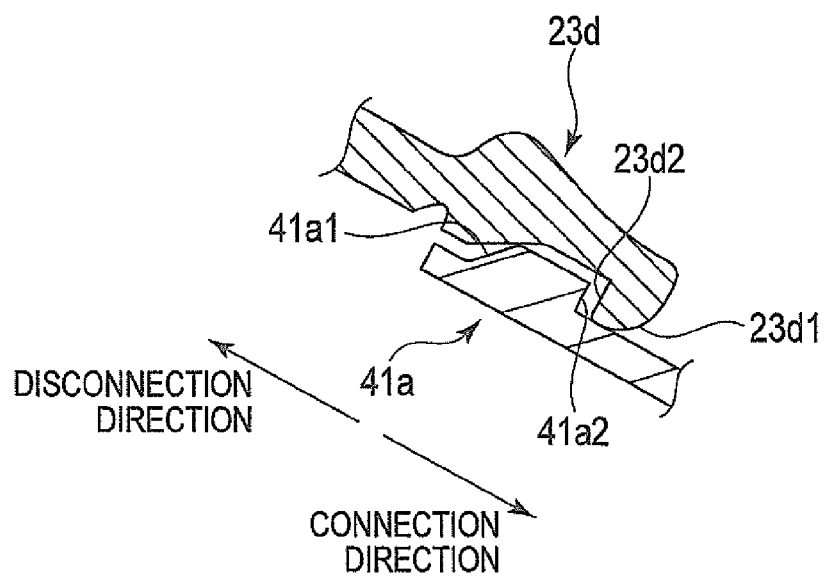
FIG. 2B is an enlarged cross-sectional view showing an engagement lever and an engagement rib.

As shown in FIG. 2A, the charge port 4 includes a connection portion 41 to which the charge connector 2 is connectable, a cable 43 (see FIG. 1), and a tube 42 for covering an end of the cable 43. The connection portion 41 is fixed with a vehicle body construction member B1 by a bracket 74. The cable 43 electrically connects the connection portion 41 with the in-vehicle battery 6. As shown in FIG. 2A and FIG. 2B, an engagement rib 41a is formed on an outer circumference of the connection portion 41. Note that, on the connection portion 41, is formed an insertion hole to which an inserted portion 22 of the charge connector 2 can be inserted only at its predetermined rotational position. Also, note that detailed illustrations of insides of the components are abbreviated.

The charge connector 2 is a standardized product whose shape and size are regulated by a unified standard, and to be connected to the charge port 4. The charge connector 2 has a grip 21, an inserted portion 22 to be inserted into the charge port 4, and an engagement lever (engagement member: engagement means) 23 to be engaged with the charge port 4. When the charge connector 2 is connected with the charge port 4, the engagement lever 23 is engaged with an engagement rib (engagement portion) 41a provided on the charge port 4 to restrict disconnection of the charge connector 2 from the charge port 4.

The engagement lever 23 is a swing member swingable about a support shaft (swing axis) 23c fixed with a case of the charge connector 2. A release button 23a of the engagement lever 23 that can be pushed while holding the grip 21 is disposed at a middle portion (near a curved boundary between the grip 21 and the inserted portion 22) of the charge connector 2. In addition, a pawl 23d to be engaged with engagement rib 41a of the charge port 4 is disposed at an end of the inserted portion 22. The engagement lever 23 is urged by an elastic member (not shown) such as a coil spring so that the release button 23a is located at an upper position as shown in FIG. 2(a) (so that the pawl 23d is located at a lower position).

As shown in FIG. 2B, an end surface of the pawl 23d is formed as a smoothly curved surface 23d1, and a back surface of the pawl 23d is formed as a barbed surface 23d2. On the other hand, an end edge of the engagement rib 41a is formed as a sloped surface 41a1, and a back surface of the engagement rib 41a is formed as an engagement surface 41a2 to be engaged with the barbed surface 23d2 of the pawl 23d.

When connecting the charge connector 2 to the charge port 4, it is not required to operate the release button 23a, and the pawl 23d gets over the engagement rib 41a due to a slidably contact of the curved surface 23d1 and the sloped surface 41a1. Then, the barbed surface 23d2 is engaged with the engagement surface 41a2 when the pawl 23d has got over the engagement rib 41a, and the engagement of the pawl 23d and the engagement rib 41a is maintained by the elastic member. Note that it is possible to connect the charge connector 2 to the charge port 4 while pressing the release button 23a.

If the charge connector 2 is pulled without the release button 23a pressed, disconnection of the charge connector 2 from the charge port 4 is restricted by the engagement of the pawl 23d and the engagement rib 41a. When disconnecting the charge connector 2 from the charge port 4, the engagement lever 23 is swung by pushing the release button 23a and thereby the pawl 23d is disengaged with the engagement rib 41a.

Figure 3:
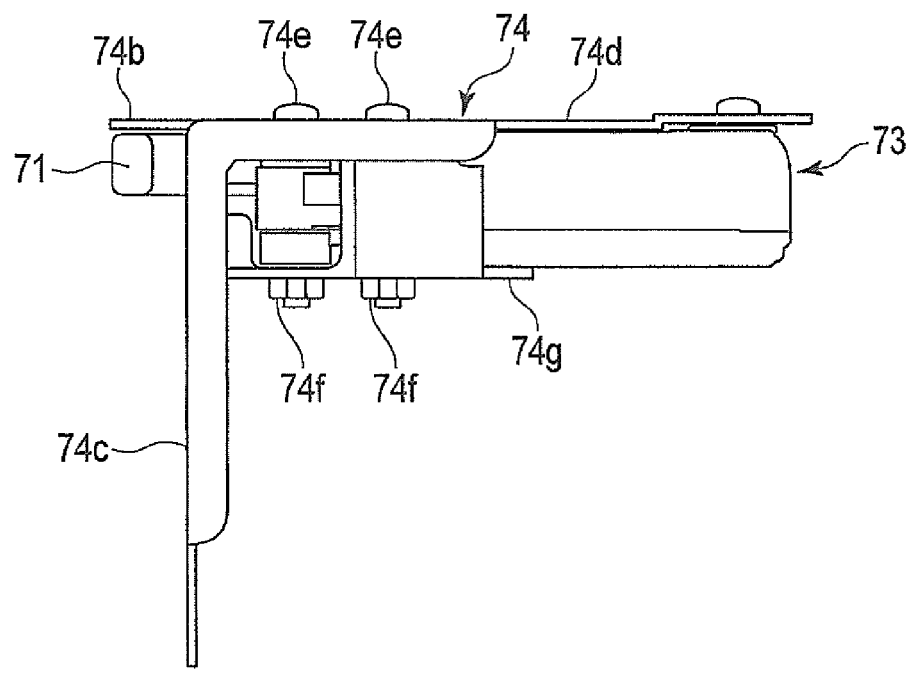
FIG. 3 is a side view of a lock mechanism of the charge port lock device.
Figure 4:
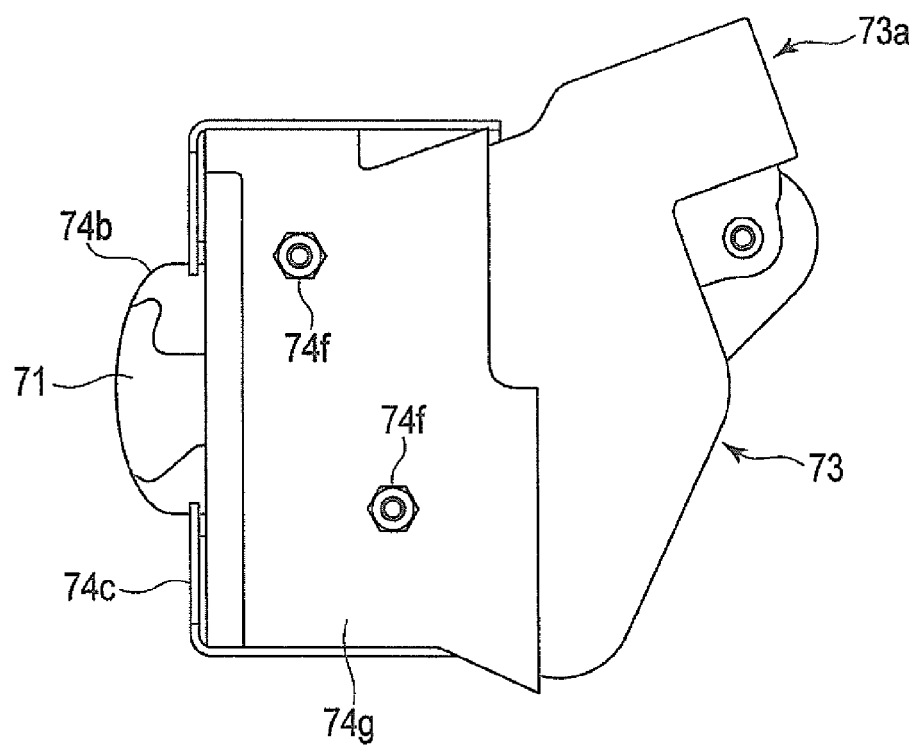
FIG. 4 is a bottom view of the lock mechanism.

As shown in FIG. 2A, a lock mechanism 7 for restricting a swing motion of the engagement lever 23 is provided above the charge port 4. As shown in FIG. 3 and FIG. 4, the lock mechanism 7 includes a swing arm (restriction member: restriction means) 71, a lock actuator 73 for driving the swing arm 71, and a bracket 74. The swing arm 71 restricts the disengagement of the pawl 23d from the engagement rib 41a by restricting the swing motion of the engagement lever 23 when located at a disengagement position of the pawl 23d of the engagement lever 23. The bracket 74 supports the connection portion 41 of the charge port 4.

As shown in FIG. 3 and FIG. 4, the bracket 74 has an upper plate 74d, an expanded plate 74b, side plates 74c, and a cover plate 74g. The lock actuator 73 is fixed with the upper plate 74d by bolts 74e. The expanded plate 74b is expanded from the upper plate 74d so as to cover a movable range of the swing arm 71 from above. The side plates 74c are extended downward from the upper plate 74d. The connection portion 41 of the charge port 4 is fixed with the side plates 74c by bolts (see FIG. 7). The lock actuator 73 is sandwiched by the upper plate 74d and the cover plate 74g.

The lock actuator 73, the upper plate 74d and the cover plate 74g are integrally assembled by the bolts 74e and nuts 74f. An opening 74a is formed on the upper plate 74d to operate an after-explained fastening screw 72 (see FIGS. 2, 7 and so on). When the lock mechanism 7 fails, the front hood 31 (see FIG. 1) is opened and then the fastening screw 72 is forcibly rotated by a screwdriver or the like through the opening 74a.

Figure 5:
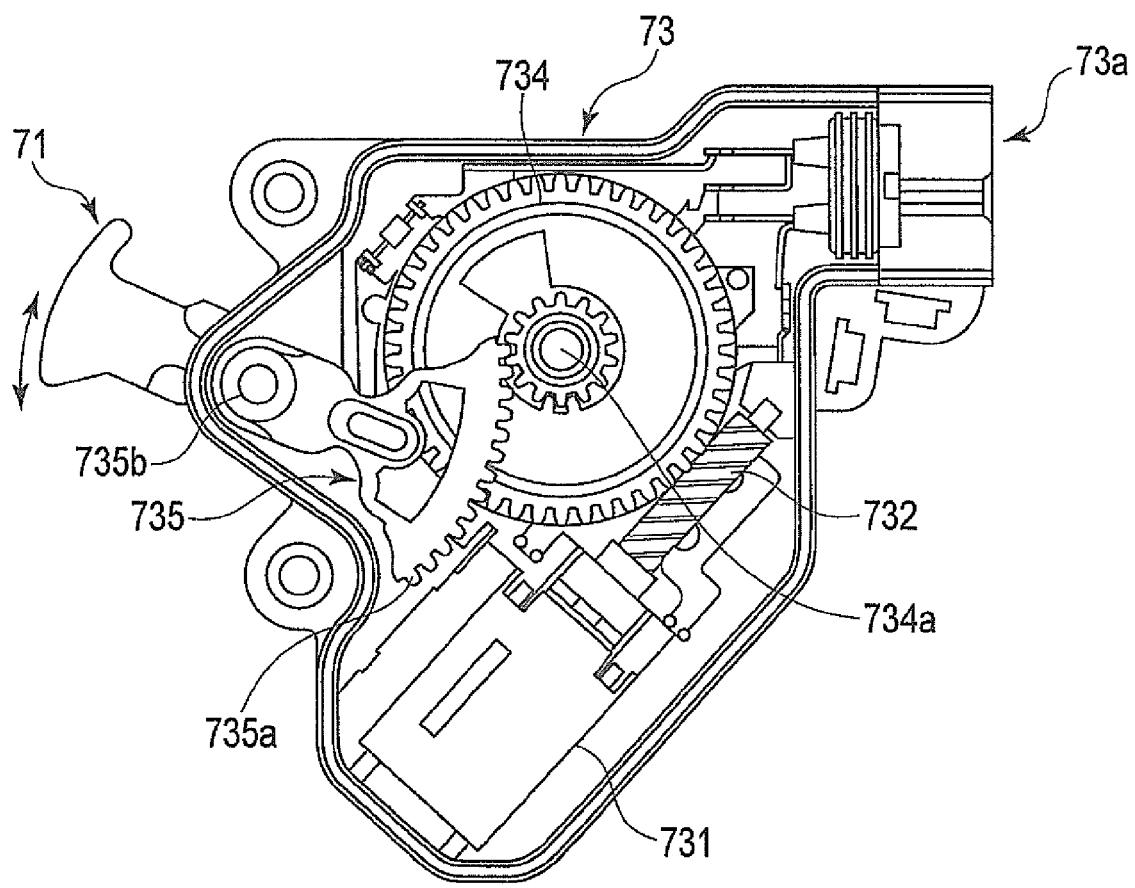
FIG. 5 is a bottom view showing an inside of the lock mechanism.

As shown in FIG. 5, the lock actuator 73 has a connector 73a, a motor 731, a worm gear 732, a worm wheel 734, and a sector gear 735. The lock actuator 73 is connected with an external power supply and a controller through the connector 73a. The motor 731 is driven based on a command signal from the controller. The worm gear 732 is fixed with an output shaft of the motor 731. The worm wheel 734 meshes with the worm gear 732 at its outer circumferential gear teeth, and is rotated by rotations of the worm gear 732. A drive gear 734a is monolithically formed concentrically at the center of the worm wheel 734. The sector gear 735 meshes with the drive gear 734a, and is rotated by rotations of the worm wheel 734 (i.e. the drive gear 734a).

The sector gear 735 has a meshing portion 735a on whose outer circumference gear teeth are formed, and a hub 735b integrally coupled with the swing arm 71. The swing arm 71 is a rotational member rotatable about a rotational axis, different from the support shaft (swing axis) 23c of the engagement lever 23, at the center of the hub 735b in a rotational direction different from connection and disconnection directions of the charge connector 2 with the charge port 4. Since it is sufficient that the swing arm 71 in the present embodiment rotates only in a predetermined rotational angle range, the sector gear 735 enables it possible to swing the swing arm 71 by the small motor 731. Note that the lock actuator 73 in the present embodiment is commonly used as an actuator applied to an automatic door lock devise for a vehicle and thereby can bring reduction of production costs.

Figure 6:
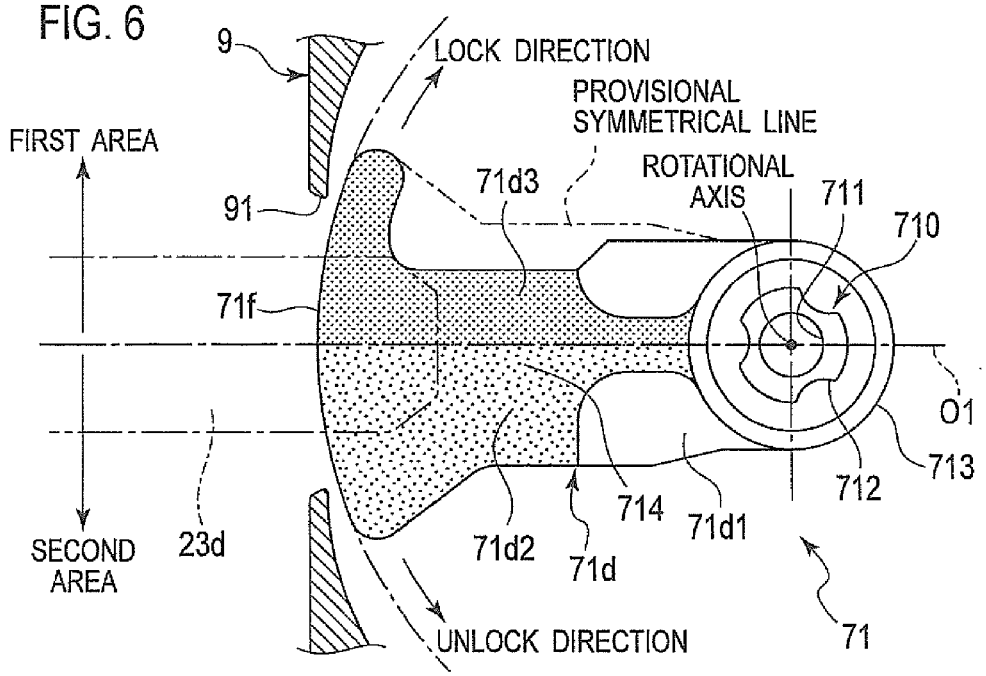
FIG. 6 is a bottom view of a swing arm of the lock mechanism.

As shown in FIG. 6, the swing arm 71 has an attachment portion 710 fixed with a hub 735b of the lock actuator 73, and a cylindrical wall 713 surrounding the attachment portion 710. Three concave portions 712 are formed on a circumference of the attachment portion 710. Rotations of the swing arm 71 to the sector gear 735 are restricted by the engagement of engagement ribs formed on the hub 735b and the concave portions 712. A through hole 711 is formed at the center of the attachment portion 710. When the swing arm 71 binds due to freeze, the through hole 711 functions also as a flow passage of hot water for melting the freeze to accelerate melting of the freeze. The fastening screw 72 is fixed with an internal threads formed in the hub 735b after inserted through the through hole 711 to integrally couple the swing arm 71 with the sector gear 735.

A fastening rotational direction of the fastening screw 72 is set to an unlock direction of the swing arm 71. Namely, when the lock mechanism 7 (the lock actuator 73) fails, the swing arm 71 can be rotated in the unlock direction by manually rotating the fastening screw 72 in the fastening rotational direction by using a screwdriver or the like.

Figure 7:
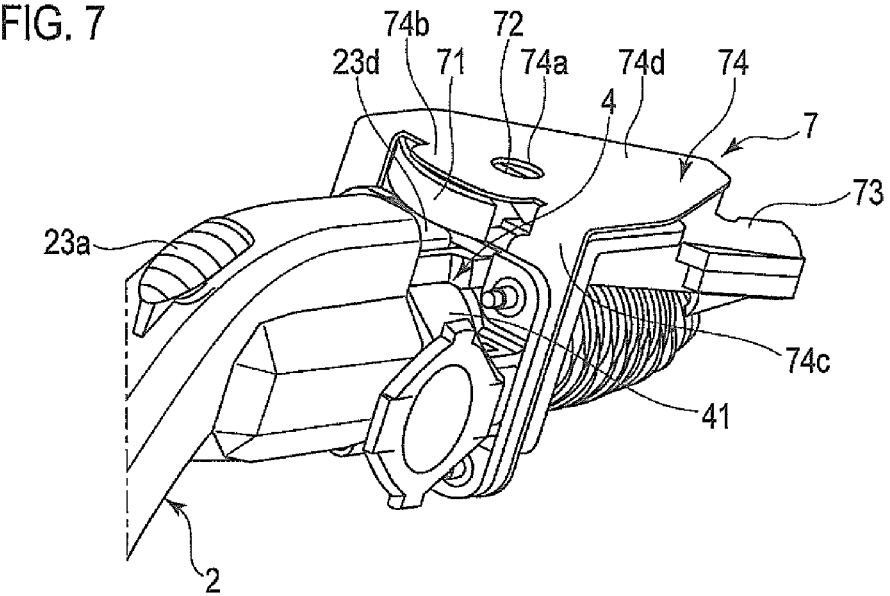
FIG. 7 is a perspective view showing a connected state of the charge connector and the charge port.

As shown in FIGS. 2A, 2B and FIG. 7, the fastening screw 72 is disposed inside the above-explained opening 74a, and can be forcibly rotated by a screwdriver or the like through the opening 74a when the front hood 31 (see FIG. 1) is opened. In order to open the front hood 31, a release lever provided in a passenger compartment should be operated. Namely, the fastening screw 72 doesn't become operable when the lid 32 is opened, but becomes operable when the front hood 31 is opened. Therefore, a person unable to enter into a passenger compartment cannot operate the fastening screw 72. Note that, since a screwdriver is equipped as an in-vehicle tool, a person able to enter into a passenger compartment can easily operate the fastening screw 72.

As shown in FIG. 6, the swing arm 71 is made of resin, and an arm 71d is extended from its cylindrical wall 713. An end of the arm 71d is made wider, and overlaps with the pawl 23d of the engagement lever 23 in a state for restricting the engagement lever 23 from swinging. Thin planar portions 71d1 for light-weighting and a rib 714 for ensuring strength are formed in the arm 71d.

The swing arm 71 has an asymmetric shape with respect to its centerline. Hereinafter, a line connecting a rotational center of the swing arm 71 (an intersection point of the rotational axis with a center plane of a thickness of the swing arm 71) with a swing center of the engagement lever 23 in a restriction state (an intersection point of the swing axis with a center plane of a thickness of the engagement lever 23) is denoted as an axial line O1. In a bottom view shown in FIG. 6, a provisional symmetrical line with respect to the axial line O1 is indicated by a dotted line. One side (an upper side in FIG. 6) of the axial line O1 is a side toward which the swing arm 71 is moved when the engagement lever 23 is transferred, by the lock mechanism 7, from its unrestricted state (unlock state) to its restricted state (lock state), and defined as a first area. On the other hand, another side (a lower side in FIG. 6) of the axial line O1 is defined as a second area.

If the swing arm 71 has a symmetry shape, the swing arm 71 extends to the provisional symmetrical line in the first area. In this case, there is a problem explained below. Since the charge port 4 is disposed at a relatively low portion of a vehicle, muddy waters, sherbet snows and so on may be splashed to the charge port 4. In addition, the above muddy waters and so on may freeze at charging under a cryogenic environment, and thereby icicles may extend downward from a bottom surface of the arm 71d. If an area of the arm 71d in the first area is large, icicles may be easily formed and thereby the lock mechanism 7 cannot be unlocked due to contacts of the pawl 23d with the icicles when trying to unlock the lock mechanism 7.

Therefore, in the present embodiment, the arm 71d is widely cut out from the provisional symmetrical line toward the axial line O1 (to a vicinity of the pawl 23d). Namely, an area 71d3 (an area on a side of a rotation to the lock state based on the axial line O1) of the arm 71d in the first area is made narrower than an area 71d2 (an area on a side of a rotation to the unlock state based on the axial line O1) of the arm 71d in the second area. Therefore, icicles are less formed due to the narrow area 71d3 of the arm 71d in the first area, and thereby the swing arm 71 can be moved smoothly when unlocking. Especially, it becomes possible that icicles are less formed by cutting out the swing arm 71 (lock state) to a vicinity of the pawl 23d while restricting disengagement of the engagement lever 23 surely.

But, an outer edge 71f of the swing arm 71 is formed symmetrically with respect to the axial line O1. Namely, a length of the outer edge 71f along the rotation is not shortened in consideration of a case where a rotation of the swing arm 71 becomes insufficient due to a failure of the lock mechanism 7 (lock actuator 73). The swing arm 71 can restrict the disengagement of the engagement lever 23 more surely by forming the outer edge 71f symmetrically with respect to the axial line O1.

Figure 8:
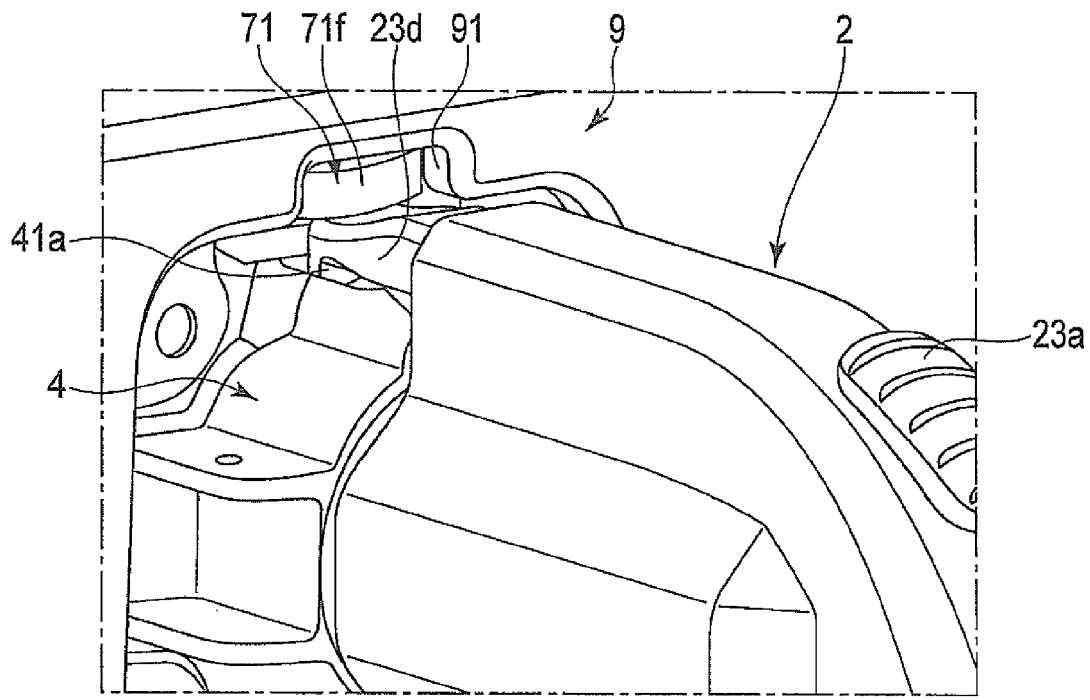
FIG. 8 is an enlarged perspective view showing a connected portion of the charge connector and the charge port.

As shown in FIG. 8, after the swing arm 71 is put in the lock state at the connection of the charge connector 2 with the charge port 4, the pawl 23d is not disengaged even if the release button 23a is pushed. Namely, the engagement between the engagement rib 41a and the pawl 23d is not disengaged, so that the disconnection of the charge connector 2 from the charge port 4 is prohibited. Note that a cover 9 for covering circumference of the charge port 4 is provided around the charge port 4. The cover 9 prevents that an undesired object is inserted into the lock mechanism 7, but a cutout 91 is formed at a swing range of the engagement lever 23. In the lock state of the lock mechanism 7, a portion of the swing arm 71 is exposed through the cutout 91.

When charging is started after the lock mechanism 7 is operated with the charge connector 2 connected with the charge port 4, the outer edge 71f of the swing arm 71 is exposed through the cutout 91 as shown in FIG. 8. If a gap between the cover 9 and the outer edge 71f is large, there is a possibility of unlocking the swing arm 71 forcibly by utilizing the gap. Therefore, the gap between the cover 9 and the outer edge 71f is made as narrow as possible so that both of them are not contacted with each other.

In addition, in the lock state of the lock mechanism 7, the cutout 91 is completely closed by the outer edge 71f of the swing arm 71 (see FIG. 6). Namely, the length of the outer edge 71f along the rotational direction is made longer than an opening width (a length along the rotational direction) of the cutout 91. Therefore, no chink is formed between the cover 9 and the outer edge 71f (the swing arm 71) at the cutout 91, so that the swing arm 71 is never unlocked forcibly by utilizing the chink.

Further, as shown in FIG. 6, a clearance between an inner surface of the cover 9 and a trajectory of the swing arm 71 is made gradually narrower toward the cutout 91. Namely, if the charge connector 2 is connected to the charge port 4 in a state where an undesired object (e.g. mud, dusts and so on) clings on the pawl 23d and then the swing arm 71 is rotated, the undesired object is swept away by the clearance gradually made narrower and drops off without getting stuck. Here, if the above-mentioned clearance is made gradually wider, constant or stepped, the removed undesired object gets stuck in the clearance to generate large friction and thereby an operation of the swing arm 71 may be inhibited. Therefore, the swing arm 71 can be operated smoothly by making the above-mentioned clearance gradually narrower toward the cutout 91.

Figure 9:
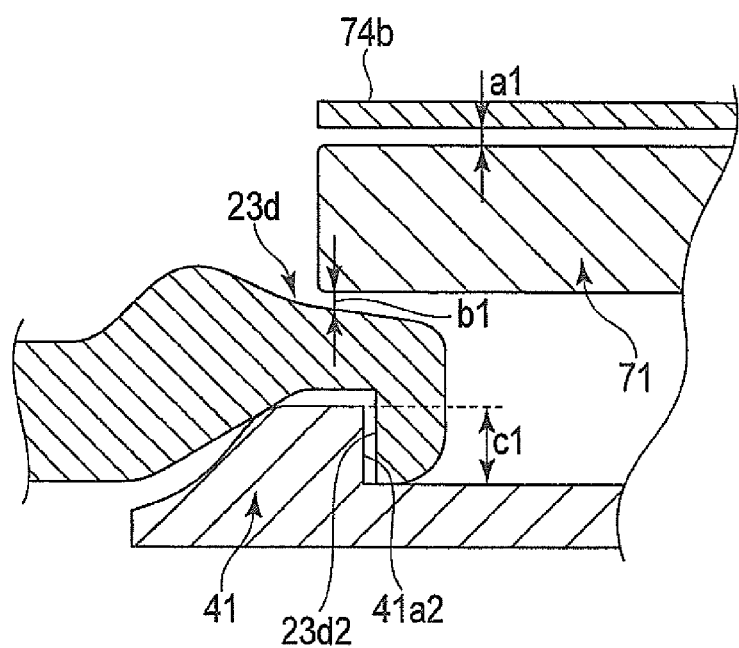
FIG. 9 is an enlarged cross-sectional view showing an engagement lever and the swing arm.

As shown in FIG. 9, a clearance a1 is formed between an upper face of the swing arm 71 and the expanded plate 74b, and a clearance b1 is also formed between a bottom face of the swing arm 71 and the pawl 23d. Therefore, the swing arm 71 can rotate smoothly without contact with the expanded plate 74b and the pawl 23d. Here, when an overlapped height of the barbed surface 23d2 and the engagement surface 41a2 is denoted c1, a relation c1>(a1+b1) is satisfied. Therefore, as shown in FIG. 10, even when the pawl 23d is pushed upward to close the clearances a1 and b1, the engagement of the barbed surface 23d2 and the engagement surface 41a2 is maintained.

Figure 10:
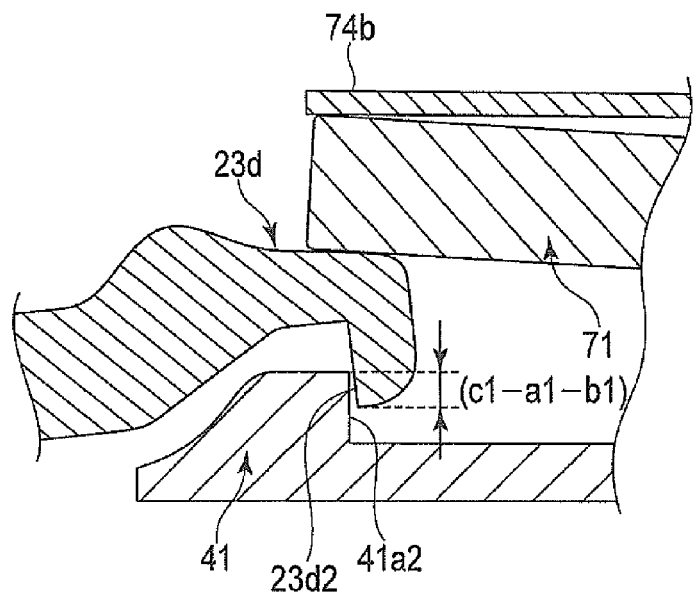
FIG. 10 is an enlarged cross-sectional view showing a state where the engagement lever is to be forcibly disengaged.

As shown in FIG. 10, when the release button 23a is pushed in the lock state of the lock mechanism 7, the pawl 23d pushes the swing arm 71 upward. Since the swing arm 71 is made of resin and the hub 735b of the lock actuator 73 is not designed rigidly, the swing arm 71 is moved upward due to its own deformation and an inclination of the rotational axis (the center axis of the hub 735b). However, further deformation of the swing arm 71 is prohibited by its contact with the expanded plate 74b made of metal. In addition, only a compression force applies to the swing arm 71 in its thickness direction, so that the swing arm 71 even made of resin holds sufficient strength against the compression force.

Namely, the swing arm 71 rotates in the rotational direction different from the connection direction and the disconnection direction of the charge connector 2 with the charge port 4 about the rotational axis different from the swing axis of the engagement lever 23. According to this configuration, the swing arm 71 can hold sufficient strength, even if the release button 23a of the engagement lever 23 is pushed in the lock state of the lock mechanism 7.

In addition, the rotational axis of the swing arm 71 and the swing axis of the engagement lever 23 is not parallel to each other, and further provided is the expanded plate 74b that prevents the disengagement of the pawl 23d from the swing arm 71 interposed on an disengagement side of the pawl 23d. Therefore, even if an unintended force is input to the lock mechanism 7 by the pawl 23d, the force doesn't act in the rotational direction of the swing arm 71. As a result, it is not required to construct a structure near the rotational axis of the swing arm 71 robustly.

As explained above, advantages explained below are brought by the charge port lock device according to the present embodiment.

The charge port lock device according to the present embodiment includes the swing arm (restriction member: restriction means) 71 that switches the engagement lever (engagement member: engagement means) 23 between the restricted state (the lock state of the lock mechanism 7) to restrict the disengagement from the engagement rib (engagement portion) 41a and the unrestricted state (the unlock state of the lock mechanism 7) not to restrict the disengagement from the engagement rib 41a, and the lock actuator 73 that drives the swing arm 71 between a lock position for putting the engagement lever 23 in the restricted state and an unlock position for putting the engagement lever 23 in the unrestricted state. Therefore, an erroneous disengagement can be avoided during charging while the charge connector 2 and the charge port 4 are connected with each other. In addition, since the lock mechanism 7 (the swing arm 71 and the lock actuator 73) is provided on a vehicle, the above advantages can be brought at an existing charging station.

In the charge port lock device according to the present embodiment, the engagement lever (engagement member) 23 is the swing member swingable about the swing axis (i.e. the engagement member=the swing member), and the swing arm (restriction member) 71 is the rotational member rotatable about the rotational axis different from the swing axis in the rotational direction different from the connection direction (and the disconnection direction) of the charge connector 2 with the charge port 4 (i.e. the restriction member=the rotational member). Therefore, even if disengagement is tried by adding a force for swinging the engagement lever 23 in the lock state of the lock mechanism 7, the swing arm 71 is not rotated by the force and thereby prevented can be the disconnection of the charge connector 2 from the charge port 4 in the lock state.

In the charge port lock device according to the present embodiment, in the restricted state of the engagement lever (engagement member) 23, the engagement lever 23 and the swing arm 71 (the restriction member) are in a non-contacted state (see FIG. 9). Therefore, the swing arm 71 can be operated smoothly.

Second Embodiment

Next, a second embodiment will be explained. Fundamental configurations of a charge port lock device according to the present embodiment are identical to the configurations of the charge port lock device according to the above-explained first embodiment. Therefore, only configurations different from those of the charge port lock device according to the above-explained first embodiment will be explained hereinafter.

Figure 11:
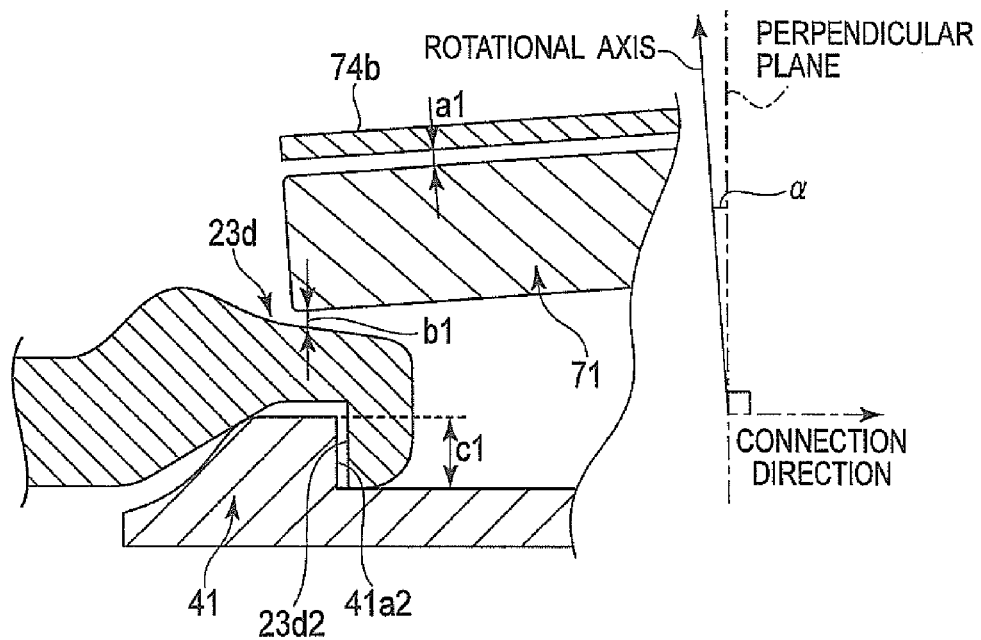
FIG. 11 is an enlarged cross-sectional view of an engagement lever and a swing arm in a charge port lock device according to a second embodiment.

In the above-explained first embodiment, the rotational axis of the swing arm 71 is provided parallel to a plane perpendicular to the connection direction (and the disconnection direction) of the charge connector 2. On the other hand, in the present embodiment, as shown in FIG. 11, the rotational axis of the swing arm 71 intersects with a plane perpendicular to the connection direction (and the disconnection direction) of the charge connector 2 (is not parallel to the perpendicular plane). Namely, the rotational axis of the swing arm 71 intersects with the perpendicular plane at an angle α (>0).

Here, the angle α is set so that the outer edge 71f of the swing arm 71 is made closer to the engagement lever 23. Therefore, even when the pawl 23d is pushed upward in the lock state of the lock mechanism 7, the push-upward force can be received also by the rotational axis. As a result, the disengagement of the engagement lever 23 can be restricted more stably. Note that the expanded plate 74b is also provided in the present embodiment, but the expanded plate 74b may not be provided when strength of the swing arm 71 is sufficiently ensured.

As explained above, advantages explained below are brought by the charge port lock device according to the present embodiment in addition to the above-explained advantages brought by the first embodiment.

In the charge port lock device according to the present embodiment, the rotational axis of the swing arm (restriction member=rotational member) 71 intersects with the plane perpendicular to the connection direction (and the disconnection direction) of the charge connector 2 with the charge port 4. Therefore, when the pawl 23d is pushed upward in the lock state of the lock mechanism 7, its push-upward force can be received also by the rotational axis of the swing arm 71. As a result, the disengagement of the engagement lever 23 can be restricted more stably.

Note that, if strength of the swing axis of the swing arm 71 is not sufficiently ensured, the angle α may be set so as to make the outer edge 71f of the swing arm 71 distanced away from the engagement lever 23. In this case, when the pawl 23d is pushed upward in the lock state of the lock mechanism 7, it can warp the swing arm 71 while releasing its push-upward force adequately. As a result, durability of the charge port lock device can be improved.

Third Embodiment

Next, a third embodiment will be explained. Fundamental configurations of a charge port lock device according to the present embodiment are also identical to the configurations of the charge port lock device according to the above-explained first embodiment. Therefore, only configurations different from those of the charge port lock device according to the above-explained first embodiment will be explained hereinafter.

Figure 12:
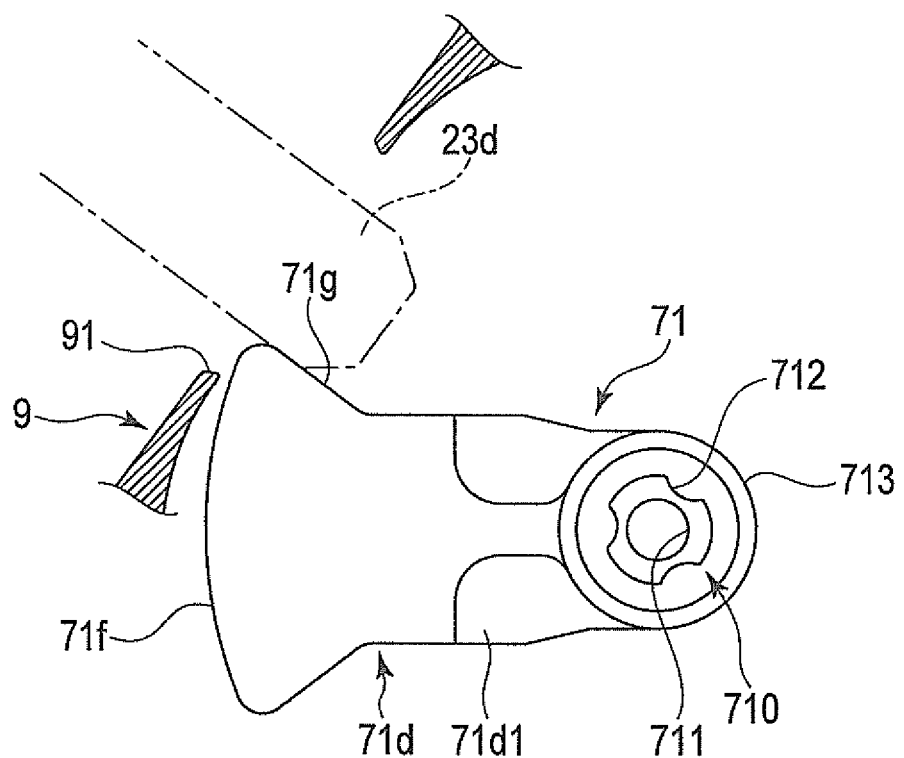
FIG. 12 is a bottom view of a swing arm in a charge port lock device according to a third embodiment.
Figure 13:
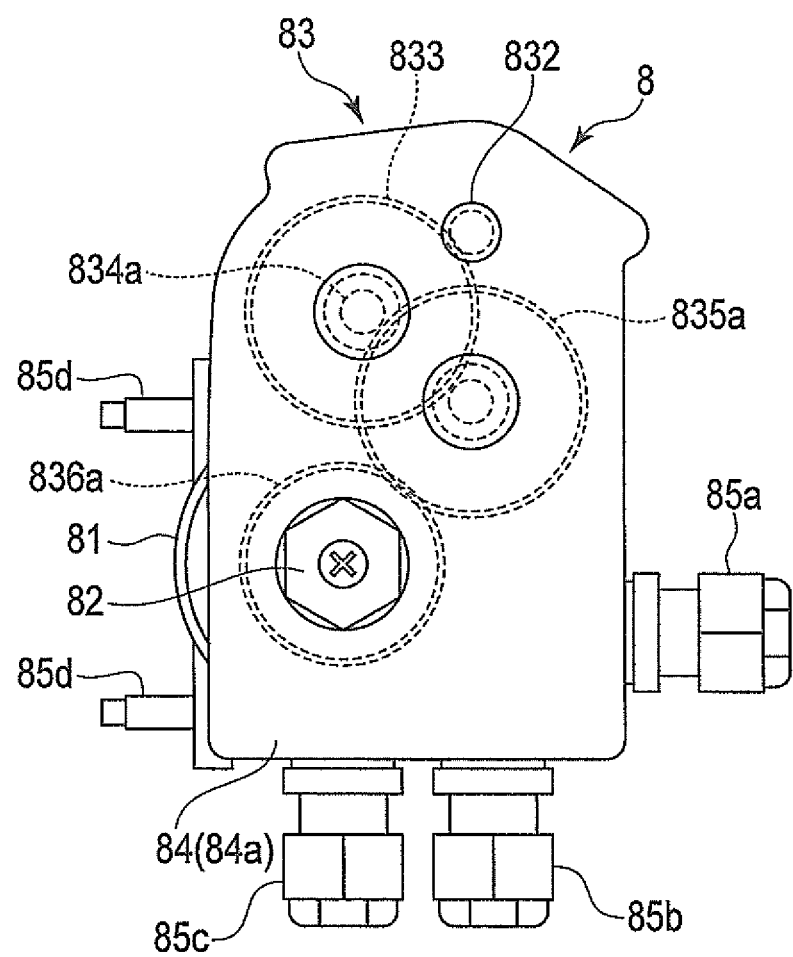
FIG. 13 is a plan view of a lock mechanism in a charge port lock device according to a fourth embodiment.

In the above-explained first embodiment, the swing arm 71 has an asymmetric shape with respect to its axial line O1 (centerline). On the other hand, a swing arm 71 in the present embodiment has a symmetric shape with respect to its axial line O1 (centerline) as shown in FIG. 12. Specifically, during transferring to the lock state, a side face of the pawl 23d becomes parallel to a side face 71g of the swing arm 71. Therefore, during transferring to the lock state, an overlapped area of the swing arm 71 and the pawl 23d can be made large quickly. As a result, even when the swing arm 71 is not rotated sufficiently during transferring to the lock state due to a failure of the lock actuator 73, the restricted state of the engagement lever 23 can be maintained more surely.

Note that also the advantages brought by the charge port lock device according to the first embodiment can be brought by the charge port lock device according to the present embodiment. In addition, if the above-explained configuration of the second embodiment is also adopted, the advantages brought by the second embodiment can be also brought.

Fourth Embodiment

Next, a fourth embodiment will be explained. Fundamental configurations of a charge port lock device according to the present embodiment are also identical to the configurations of the charge port lock device according to the above-explained first embodiment. Therefore, only configurations different from those of the charge port lock device according to the above-explained first embodiment will be explained hereinafter.

In the lock mechanism 7 in the above-explained first embodiment, the swing arm (restriction member=restriction means) 71 is rotated. On the other hand, in a lock mechanism 8 in the present embodiment, a rotary plate (restriction member=restriction means) 81 is rotated. The lock mechanism 8 includes a lock actuator 83. Plural gears 838 to 836a and the rotary plate 81 are housed in a housing 84 of the lock actuator 83. The housing 84 includes a lower housing 84b that is opened upward, an upper housing 84a for closing the opening of the lower housing 84b, a bracket 84d provided around the rotary plate 81 and attached to the charge port 4, and a motor case 84c for accommodating a motor 831. In addition, fastening members (bolts) 85d used for fixation to a vehicle body are attached to the bracket 84d. Further, the housing 84 has ports 85a to 85c for connecting the motor 831, a sensor(s) (not shown) and so on with the external power supply and the controller.

A pinion gear 832 provided on an output shaft of the motor 831 meshes with a first gear 833 rotatable integrally with a first rotary shaft 834. A first rotary shaft gear 834a is formed on an outer circumferential surface of the first rotary shaft 834. The first rotary shaft gear 834a meshes with a second gear 835a provided integrally with a second rotary shaft 835. The second gear 835a meshes with a third gear 836a provided integrally with a third rotary shaft 836.

The first rotary shaft 834, the second rotary shaft 835 and the third rotary shaft 836 are rotatably supported by the upper housing 84a and the lower housing 84b with bearings 834b, 835b and 836b interposed therebetween, respectively. Therefore, each of the first rotary shaft 834, the second rotary shaft 835 and the third rotary shaft 836 has sufficient strength against a force in a direction for inclining each. When a drive command is output to the motor 831, the output shaft of the motor 831 is rotated and its rotational force is sequentially transmitted to the first rotary shaft 834, the second rotary shaft 835. Then, the rotary plate 81 fixed with the third rotary shaft 836 by a fastening screw 82 is rotated.

Figure 14:
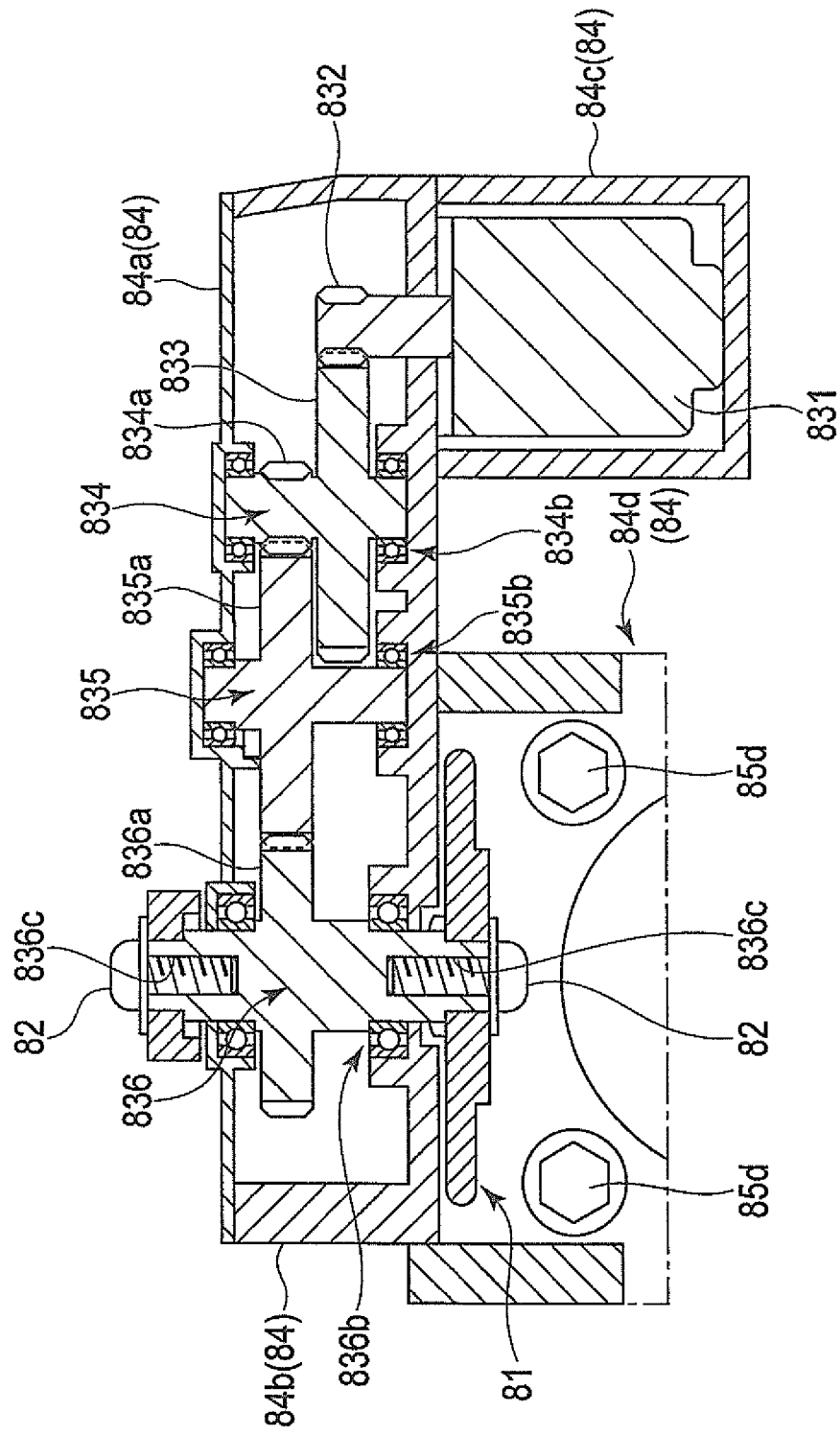
FIG. 14 is a cross-sectional view taken by a cross-sectional line passing along gear axes in the lock mechanism.

Note that screw holes 836c are formed on both sides of the third rotary shaft 836, respectively. One end (on an upper side in FIG. 14) of the third rotary shaft 836 is protruded out from the upper housing 84a, and a fastening screw 82 is attached to the screw hole 836c on the one end. Note that the fastening screw 82 can be rotated by a plus screwdriver and can be also rotated by a hexagonal wrench. On the other hand, another end (on a lower side in FIG. 14) of the third rotary shaft 836 is protruded out from the lower housing 84b, and the rotary plate 81 is fixed to the screw hole 836c on the other end by the fastening screw 82.

A fastening rotational direction of the fastening screw 82 is set to an unlock direction of the rotary plate 81. Namely, when the lock mechanism 8 (the lock actuator 83) fails, the rotary plate 81 can be rotated in the unlock direction by manually rotating the fastening screw 82 in the fastening rotational direction by using a screwdriver, a hexagonal wrench or the like.

The fastening screw 82 can be forcibly rotated by a screwdriver or the like when the front hood 31 (see FIG. 1) is opened. In order to open the front hood 31, a release lever provided in a passenger compartment should be operated. Namely, the fastening screw 82 doesn't become operable when the lid 32 is opened, but becomes operable when the front hood 31 is opened. Therefore, a person unable to enter into a passenger compartment cannot operate the fastening screw 82. Note that, since a screwdriver and a spanner are equipped as an in-vehicle tool, a person able to enter into a passenger compartment can easily operate the fastening screw 82.

Figure 15A:
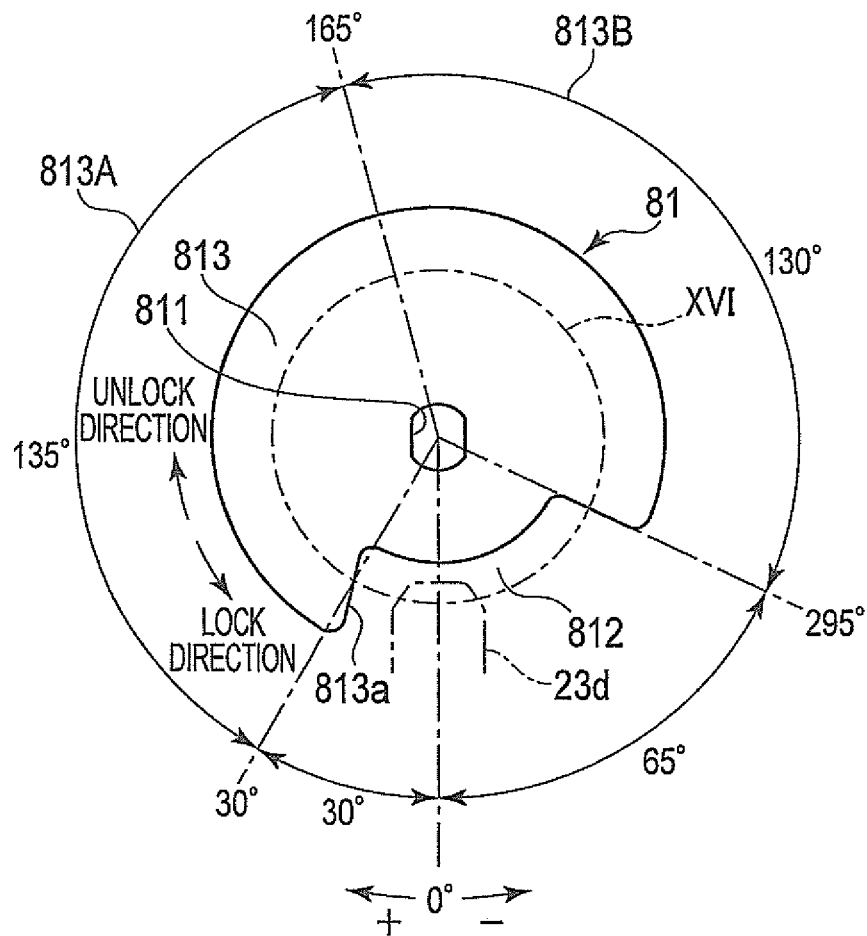
FIG. 15A is a bottom view of a rotary plate of the lock mechanism.

In addition, as shown in FIG. 15A, the rotary plate 81 is a circular disk member, and a trough hole 811 through which the third rotary shaft 836 passes is formed at its center. A cutout 812 partially cut out is formed on a circumferential edge of the rotary plate 81. The circumferential edge of the rotary plate 81 other than the cutout 812 is a restriction portion 813. Note that FIG. 15A shows a state where the charge connector 2 is connected with the charge port 4 and the lock mechanism 8 is in its unlock state (the engagement lever 23 is in the unrestricted state). Hereinafter, an angular position of the pawl 23d of the engagement lever 23 is denoted as 0°, and a clockwise direction is denoted as a forward direction.

The cutout 812 is formed from an angular position −65° to +30°. Namely, the cutout 812 has a range of 95° along a circumferential direction. The pawl 23d occupies a range of almost 40° along the circumferential direction at a maximum, so that the cutout 812 occupies a range twice as wide as that of the pawl 23d. Therefore, even if the rotary plate 81 is excessively returned due to a failure of the lock actuator 83 during the unlock state of the lock mechanism 8, the unlock state can be maintained.

In addition, by making a range of the cutout 812 sufficiently wider than a range occupied by the pawl 23d, following advantages can be brought. Namely, when an undesired cohesive object clings at the cutout 812, the cutout 812 may be blocked up by the undesired object. In such a case, if the range of the cutout 812 is narrow, the undesired object may cling firmly at an entire range of the cutout 812. However, by making the range of the cutout 812 wide, it can be avoided that the undesired object clings firmly at an entire range of the cutout 812. In addition, if the undesired object clings at one side of the cutout 812, the undesired object easily drops off because another side thereof is still in a cutout state. Therefore, the undesired object can be removed adequately.

Figure 15B:
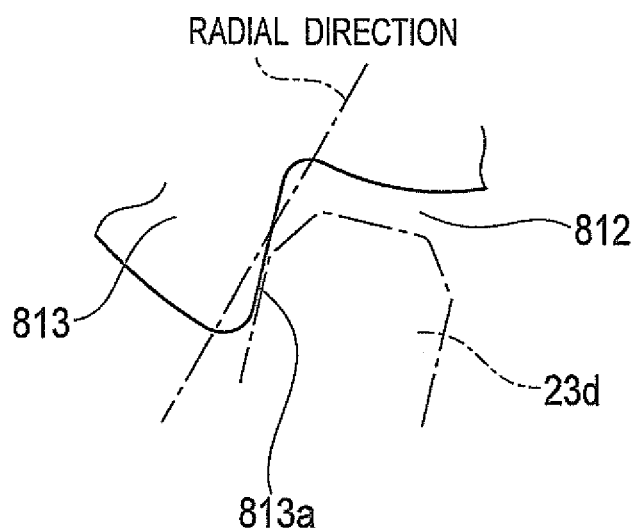
FIG. 15B is an enlarged bottom view showing a cutout and a pawl.

The restriction portion 813 is formed from an angular position +30° to +295°. Namely, the restriction portion 813 has a range of 265° along the circumferential direction. A circumferential edge of the restriction portion 813 is formed as an edge having a smoothly curved surface at its entire range (see FIG. 14 and FIG. 17). A start edge 813a (i.e. an end of the cutout 812) of the restriction portion 813 is inclined to a radial direction. As shown in FIG. 15B, the start edge 813a is inclined so that an area of the restriction portion 813 is made larger (the area of the cutout 812 is made smaller). Specifically, the start edge 813a is inclined so that the start edge 813a becomes parallel to the side face of the pawl 23d at a start of transferring to the lock state by the rotary plate 81. Therefore, during transferring to the lock state, an overlapped area of the rotary plate 81 and the pawl 23d can be made large quickly. As a result, the restricted state of the engagement lever 23 can be achieved more quickly and more surely.

Figure 16:
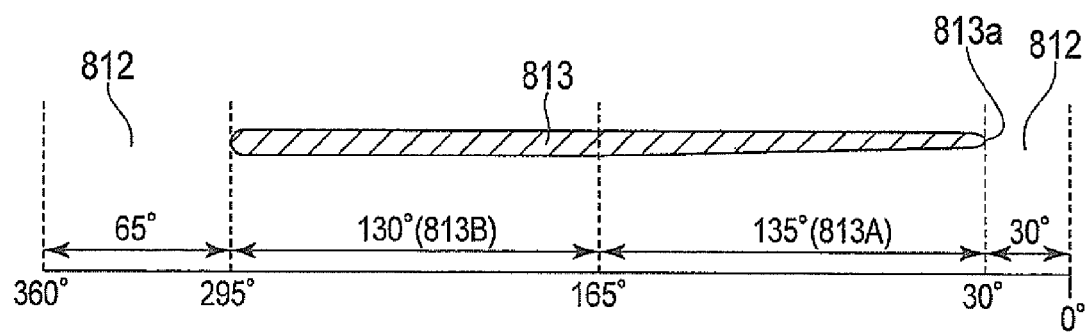
FIG. 16 is an expanded cross-sectional view taken along a line XVI shown in FIG. 15A.

FIG. 16 is a cross-sectional view made by expanding a circumferential cross-sectional shape of the rotary plate 81 taken along a cross-sectional line XVI shown in FIG. 15A. As shown in FIG. 16, a first segment 813A of the restriction portion 813 within a range from an angular position 30° to 165° is tapered so that it made gradually thinner along the circumferential direction toward the cutout 312. Therefore, even if the pawl 23d has dispersion with its height, the restriction portion 813 can be inserted into a space above the pawl 23d unfailingly. In addition, even if the pawl 23d and the restriction portion 813 get stuck with each other during transferring to the lock state, the stuck can be solved relatively easily because the rotary plate 81 made of resin can make its own frictional resistance small and make itself easily deformable.

On the other hand, a second segment 813B at a range from an angular position 165° to 295° has a constant thickness. If the second segment 813B is made tapered continuously from the first segment 813A, a whole of the rotary plate 81 may become thick and thereby its installability on a vehicle degrades. In addition, if the rotary plate 81 is excessively rotated during a failure of the lock mechanism 8 (e.g. the lock actuator 83), the pawl 23d and the restriction portion 813 may get excessively stuck with each other. In such a case, it is concerned that the lock mechanism 8 isn't unlocked correctly. Therefore, by forming the second segment 813B to have a constant thickness, the lock actuator 83 can be down-sized and malfunctions during the failure can be avoided. Note that the second segment 813B is formed in a range of 130°, so that it is wider than a range occupied by the pawl 23d. Therefore, if the rotary plate 81 is excessively rotated during a failure of the lock mechanism 8 (e.g. the motor 831), the restricted state of the lock mechanism 8 can be maintained.

Figure 17:
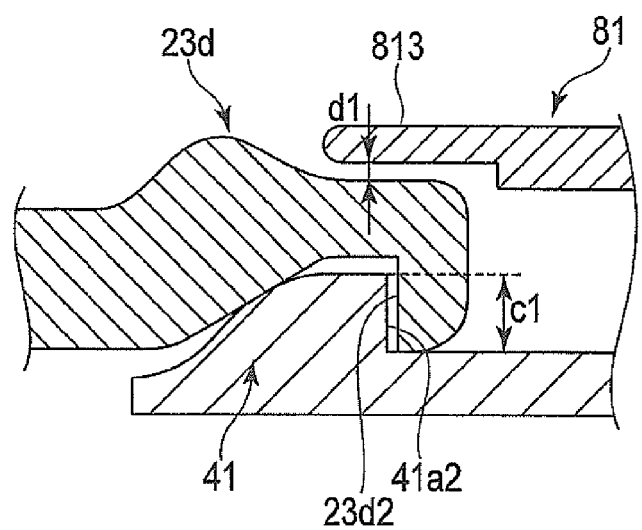
FIG. 17 is an enlarged cross-sectional view showing an engagement lever and the rotary plate of the charge port lock device.

In addition, as shown in FIG. 17, a clearance d1 is formed between a bottom face of the rotary plate 81 and the pawl 23d. Although the clearance d1 may vary along with a rotational position of the rotary plate 81, the clearance d1 is formed even in the range of the second segment 813B. Therefore, the rotary plate 81 smoothly rotates without contact with the pawl 23d. Here, when an overlapped height of the barbed surface 23d2 and the engagement surface 41a2 is denoted c1, a relation c1>d1 is satisfied. Therefore, even when the pawl 23d is pushed upward and then contacts the rotary plate 81, the engagement of the barbed surface 23d2 and the engagement surface 41a2 is maintained.

In addition, the pawl 23d contacts with the rotary plate 81 when the release button 23a is pushed in the lock state of the lock mechanism 8, so that a force is input to the rotary plate 81 by the pawl 23d. Since the third rotary shaft 836 of the lock actuator 83 is designed rigidly by the bearing 836b, it can resist sufficiently against the force input by the pawl 23d. In addition, even if the rotary plate 81 is deformed by the force input by the pawl 23d, the rotary plate 81 becomes contacted with the lower housing 84b and thereby its further deformation can be restricted.

Note that an expanded plate for covering the rotary plate 81 completely may be formed similarly to the expanded plate 74b in the first embodiment. In this case, even if deformation of the rotary plate 81 or inclination of the third rotary shaft 836 occurs, the deformation of the rotary plate 81 can be restricted sufficiently by the expanded plate. In addition, only a compression force applies to the rotary plate 81 along its thickness direction, so that the rotary plate 81 even made of resin has sufficient strength against the compression force.

Namely, the rotary plate 81 rotates in the rotational direction different from the connection direction and the disconnection direction of the charge connector 2 with the charge port 4 about the rotational axis different from the swing axis of the engagement lever 23. According to this configuration, the rotary plate 81 can hold sufficient strength, even if the release button 23a of the engagement lever 23 is pushed in the lock state of the lock mechanism 8.

In addition, the rotational axis of the rotary plate 81 and the swing axis of the engagement lever 23 is not parallel to each other, and the disengagement of the pawl 23d is restricted by interposing the rotary plate 81 on an disengagement side of the pawl 23d. Therefore, even if an unintended force is input to the lock mechanism 8 by the pawl 23d, the force doesn't act in the rotational direction of the rotary plate 81. As a result, it is not required to construct a structure near the rotational axis of the rotary plate 81 robustly.

As explained above, advantages explained below are brought by the charge port lock device according to the present embodiment similarly to the above-explained first embodiment.

The charge port lock device according to the present embodiment includes the rotary plate (restriction member: restriction means) 81 that switches the engagement lever (engagement member: engagement means) 23 between the restricted state (the lock state of the lock mechanism 8) to restrict the disengagement from the engagement rib (engagement portion) 41a and the unrestricted state (the unlock state of the lock mechanism 8) not to restrict the disengagement from the engagement rib 41a, and the lock actuator 83 that drives the rotary plate 81 between a lock position for putting the engagement lever 23 in the restricted state and an unlock position for putting the engagement lever 23 in the unrestricted state. Therefore, an erroneous disengagement can be avoided during charging while the charge connector 2 and the charge port 4 are connected with each other. In addition, since the lock mechanism 8 (the rotary plate 81 and the lock actuator 83) is provided on a vehicle, the above advantages can be brought at an existing charging station.

In the charge port lock device according to the present embodiment, the engagement lever (engagement member) 23 is the swing member swingable about the swing axis (i.e. the engagement member=the swing member), and the rotary plate (restriction member) 81 is the rotational member rotatable about the rotational axis different from the swing axis in the rotational direction different from the connection direction (and the disconnection direction) of the charge connector 2 with the charge port 4 (i.e. the restriction member=the rotational member). Therefore, even if disengagement is tried by adding a force for swinging the engagement lever 23 in the lock state of the lock mechanism 8, the rotary plate 81 is not rotated by the force and thereby prevented can be the disconnection of the charge connector 2 from the charge port 4 in the lock state.

In the charge port lock device according to the present embodiment, in the restricted state of the engagement lever (engagement member) 23, the engagement lever 23 and the rotary plate 81 (the restriction member) are in a non-contacted state (see FIG. 17). Therefore, the rotary plate 81 can be operated smoothly.

Although the invention has been described above by reference to certain embodiments of the invention, the invention is not limited to the embodiments described above. Scope of the invention should be defined in view of Claims.

For example, although the charge port 4 is disposed at a front section of a vehicle in the above embodiments, a charge port may be disposed on a rear section or a side of a vehicle. In addition, although the charge port lock device is applied to an electric vehicle in the above embodiments, it can be applied to a plug-in hybrid vehicle or the like.

The invention claimed is:

1. A charge port lock device comprising:
a charge port that is provided on a vehicle and to which a charge connector for supplying charging power to a battery installed on the vehicle is connectable;
an engagement member that is provided on the charge connector, and that restricts, while the charge connector is connected to the charge port, disconnection of the charge connector from the charge port by being engaged with an engagement portion provided on the charge port and allows the disconnection of the charge connector from the charge port by being disengaged with the engagement portion by a release operation;
a restriction member that is provided on the vehicle, and that can switch the engagement member between a restricted state to restrict disengagement from the engagement portion and an unrestricted state not to restrict disengagement from the engagement portion; and
a lock actuator that drives the restriction member between a lock position that puts the engagement member in the restricted state and an unlock position that puts the engagement member in the unrestricted state, wherein;
the engagement member and the restriction member form a clearance therebetween in the restriction state of the engagement member, and
the restriction member has a longitudinal axis extending from a rotational axis through a center of an outer edge of the restriction member, the restriction member having a smaller surface area on a side of the longitudinal axis that rotates toward the restricted state and a larger surface area on a side of the longitudinal axis that rotates toward the unrestricted state.

2. The charge port lock device according to claim 1, wherein
the engagement member is a swing member swingable about a swing axis, and
the restriction member is a rotational member rotatable about a rotational axis different from the swing axis in a rotational direction different from connection and disconnection directions of the charge connector with the charge port.

3. The charge port lock device according to claim 2, wherein
the rotational axis of the rotational member intersects with a plane perpendicular to the connection and disconnection directions.

4. A charge port lock device comprising:
a charge port that is provided on a vehicle and to which a charge connector for supplying charging power to a battery installed on the vehicle is connectable;
an engagement means that is provided on the charge connector, and that restricts, while the charge connector is connected to the charge port, disconnection of the charge connector from the charge port by being engaged with an engagement portion provided on the charge port and allows the disconnection of the charge connector from the charge port by being disengaged with the engagement portion by a release operation;
a restriction means that is provided on the vehicle, and that can switch the engagement means between a restricted state to restrict disengagement from the engagement portion and an unrestricted state not to restrict disengagement from the engagement portion; and
a lock actuator that drives the restriction means between a lock position that puts the engagement means in the restricted state and an unlock position that puts the engagement means in the unrestricted state, wherein;
the engagement means and the restriction means form a clearance therebetween in the restriction state of the engagement means
the restriction member has a longitudinal axis extending from a rotational axis through a center of an outer edge of the restriction member, the restriction member having a smaller surface area on a side of the longitudinal axis that rotates toward the restricted state and a larger surface area on a side of the longitudinal axis that rotates toward the unrestricted state.

* * * * *